United States Patent Office 2,869,369
Patented Jan. 20, 1959

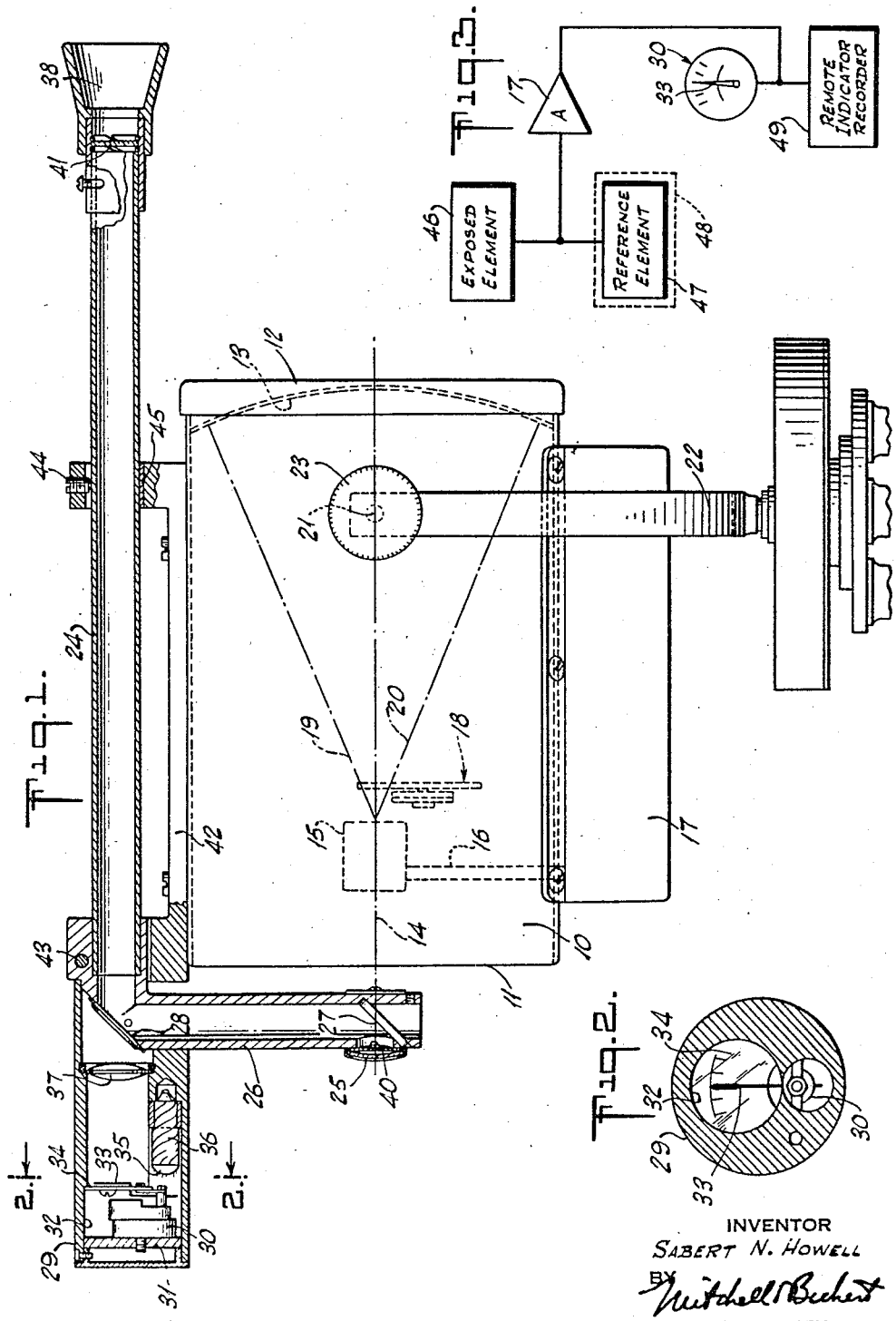

2,869,369
OPTICAL PYROMETER

Sabert N. Howell, Huntington, N. Y., assignor to Servo Corporation of America, New Hyde Park, N. Y., a corporation of New York Application December 1, 1955, Serial No. 550,356

8 Claims. (Cl. 73—355)

My invention relates to a radiation-pyrometer construction.

It is an object to provide an improved device of the character indicated.

It is another object to provide an improved radiation pyrometer in which visual sighting on a remote heat source is facilitated and rendered more accurate.

Other objects and various further features of novelty and invention will be pointed out or will occur to those skilled in the art from a reading of the following specification, in conjunction with the accompanying drawings. In said drawings, which show, for illustrative purposes only, a preferred form of the invention:

Fig. 1 is a side elevation, partly broken away on a vertical section, and showing a radiation pyrometer including an improved visual sight of my invention;

Fig. 2 is an enlarged sectional view in the plane 2—2 of Fig. 1; and

Fig. 3 is a simple electrical diagram schematically showing inter-connection of certain parts.

Briefly stated, my invention contemplates an improved sight for a radiation pyrometer of the type which lends itself to focusing on remote objects and which develops an electrical output reflecting local heat radiation from the remote object. The pyrometer includes its own optics, and the visual sight enables an accurate orientation of the pyrometer axis on the remote object. My visual sight happens to be a periscope including a sighting barrel clamped to the pyrometer housing and having an offset pick-up element on the optical axis of the pyrometer, thereby avoiding parallax problems. Nevertheless, optimum sighting on a remote small source is not always accomplished with the mere use of this type of periscope, and I have provided means whereby an electrical meter display may be optically superposed on the visually sighted field of view (as seen through the periscope eyepiece) so that one may know, by means of electrical responses superposed on the visually sighted field of view, whether a localized heat source has been pinpointed.

Referring to the drawings, my invention is shown in application to a radiation pyrometer of the type disclosed in greater detail in copending patent application, Serial No. 234,483, filed June 30, 1951, now U. S. Patent No. 2,761,072. Said pyrometer comprises an elongated tubular housing 10 having an open end 11 and a closed end 12. Collecting optics comprises a focusing mirror 13 mounted at the closed end 12 and facing out the open end 11 on the pyrometer axis 14. Fixedly mounted within the bore of the housing 10 is a heat-sensitive electrical element contained within a small capsule 15, supported on a standard 16 carried by an amplifier box 17 that is secured externally of the housing 10; the wall of the housing 10 will be understood to be longitudinally slotted toward the open end 11 so as to accommodate insertion of the detector assembly 15—16—17 as a complete unit, as disclosed in said copending application. Also fixedly mounted, but by means not shown, is a chopper assembly 18 including blades in intercepting relation with all converging rays (suggested by spaced rays 19—20 in the drawing) collected by the optics 13 and focused on the cell 15. The pyrometer assembly as a whole may be supported for tilting about an axis 21 by suspension from a tripod-mounted yoke 22; a nut or knob 23 will be understood to secure an adjusted elevation of the pyrometer assembly.

In the form shown, the visual-sighting means for the pyrometer is a periscope including a sighting barrel 24, extending longitudinally and generally parallel to the optical axis 14. A pick-up element 25 is mounted on the optical axis 14 and forward of the cell 15, and is carried by an offset tube 26 connected to the sighting barrel 24. Reflecting elements 27—28 serve to transpose the visual-sighting axis, as will be understood.

In accordance with the invention, I provide means whereby an electrical-meter indication, reflecting the electrical response of the cell 15, may always be spotted into the visually sighted field of view, as seen through the eyepiece 38. The meter and all optical parts associated therewith may be packed in a relatively small housing 29 secured to the front end of the periscope, and in a sufficiently offset position so as not to intercept any of the incoming rays to the pyrometer.

In the form shown, the meter itself 30 is mounted on a base plate 31 received in a counterbore 32 at the outer end of the housing 29. The meter includes a needle 33 swinging across a display face 34, receiving edge illumination from a lamp 35. A suitable opaque wrapping or coating 36 may be applied to the sides of the lamp 35 so as to avoid over-illumination and fogging. A lens 37 on the axis of the sighting barrel 34 serves to provide magnification and focus for viewing from the eyepiece 38, the reflecting surface 28 being preferably semi-reflecting, so that the meter needle and the scale across which it swings may very substantially occupy the field of view.

As a further feature of the invention, I provide means for adjusting the relative intensity of the visually sighted field of view and the meter display, as seen through the eyepiece 38. In the form shown, this is accomplished by means of two relatively rotatable, polarize optical elements carried in the periscope system, and located respectively on opposite sides of the location 28 at which the meter indication is introduced. Thus, a fixed first polarized element 40 may be mounted just inside the lens 25 which constitutes the pick-up element of the periscope, and a second element 41 may be carried at the eyepiece 38. The eyepiece 38 is shown to be angularly adjustable in order to rotate the element 41 so as to provide optimum intensity balance between the visually sighted field of view and the spotted-in meter display. Under some circumstances, it is desirable to completely exclude the meter indication or to completely exclude the visually sighted field of view, and in either event the rotation permitted the eyepiece 38 is sufficient to effectively accomplish these purposes.

In assembling my pyrometer, it is necessary only initially to set the periscope for alignment with the optical axis 14; once thus set, no further alignment operation is necessary. I have shown the periscope assembly to include a mounting bracket 42 secured to the outside of the pyrometer housing 10; bracket 42 includes a front yoke with pivotal connection at 43 to the offset member 26 of the periscope proper. At a rearward location, the bracket 42 includes a clamp comprising a setscrew 44 and shims 45 as necessary to produce accurate alignment of the pick-up element 25 with the pyrometer axis 14.

The electrical functioning of the element 15 has been described in said copending application. It suffices here to say that the capsule 15 may include two energy-responsive elements 46—47. The active or exposed element 46 is continuously exposed to the incident energy, represented in the drawing by the spaced rays 19—20. The inactive or reference element 47 is continuously shielded, as suggested at 48. The amplifier 17 differentially evaluates the outputs of elements 46—47 and is directly connected to the meter 30. For more accurate interpretation of the pyrometer output, an additional connection may be made to remote indicating or recording means 49.

It will be seen that I have described a relatively simple but significant improvement to the art of radiation pyrometry. My improvement in no way impairs the operation of the pyrometer, but very substantially improves the facility with which accurate readings may be obtained. In practice, I find that, even if the visual-sighting mechanism includes cross hairs, which should theoretically permit accurate sighting on a small distant object, this is still inadequate to the purpose of developing best output from the pyrometer, particularly for the situation in which radiation is localized, since there is always the uncertainty that the pyrometer may not be focused on the hottest spot in the remote object. However, with my improvement I can observe the meter needle 33 for maximum response, no matter how small or how large the distant source, and I may then know without doubt that I have accurately sighted the instrument.

While I have described the invention in detail for the preferred form shown, it will be understood that modifications may be made within the scope of the invention as defined in the claims which follow:

I claim:

1. Electrically responsive radiation pyrometer, comprising an elongated housing, an electrically responsive heat-sensitive element within said housing, collecting optics carried by said housing and focusing collected heat energy on said element, said optics having an axis extending out one end of said housing, and visual-sighting optics including a periscope having a relatively small pick-up element on said optical axis, said periscope having a sighting element carried by said housing on an axis parallel to said optical axis, the field of view of said collecting optics being coaxially aligned with the field of view of said visual-sighting optics, an electrical indicator responsive to the output of said heat-sensitive element, and means optically displaying the reading of said indicating element in the field observed when looking into said sighting element.

2. Electrically responsive radiation pyrometer, comprising a housing having an elongated bore open at one end thereof, collecting optics including a mirror enclosing one end of said bore and facing the open end of said housing on an optical axis generally aligned with that of said bore, an electrically responsive heat-sensitive cell supported on said axis and facing said mirror at the focus of said mirror, and visual sighting optics including a periscope having a relatively small pick-up element on said axis and forward of said cell, said periscope having a sighting element carried by said housing externally of those collimated rays which are collected by said optics and which are focused on said cell, the field of view of said collecting optics being bore-sighted with the field of view of said visual-sighting optics, an electrical indicator responsive to the output of said cell, and optical means displaying the indication of said indicator within the field of view sighted when viewing with said periscope.

3. A radiation pyrometer, comprising a housing with collecting optics and a heat-sensitive electrical element carried within said housing on an optical axis extending away from said housing, said element being at the focus of said optics, visual-sighting means independent of at least a part of the optics within said pyrometer and including a pick-up element on the axis of said pyrometer, the visually-sighted field of view being bore-sighted with that of said pyrometer, an electrical indicator responsive to the output of said heat-sensitive element, and means optically displaying said indicator in the visually sighted field of view.

4. A pyrometer according to claim 3, in which said visual sighting optics is a periscope including an elongated sighting barrel generally parallel to the axis of said pyrometer and with an offset pick-up element on the axis of said pyrometer, two reflecting elements for off-setting the sighting axis to coincide with the pyrometer axis, one of said reflecting elements being semi-reflecting, said electrical-indicator means being optically visible through said semi-reflecting element when visually sighting with said periscope.

5. An infrared optical pyrometer, comprising a tubular housing having a closed end and a bore open at the other end, a collecting mirror mounted within said closed end on an optical axis generally aligned with that of said bore, an infrared-sensitive electrical element fixedly mounted within said bore and facing said mirror at the focus of said mirror, and a visual-sighting periscope including a sighting barrel including an eyepiece and mounted externally of said housing on an axis parallel to said optical axis, said periscope including a relatively thin offset member extending radially inwardly at the open end of said housing and rigidly supporting a pick-up element on said optical axis forward of said cell, an electrical indicator responsive to the output of said infrared-sensitive element, optical means intermediate said pick-up element and the sighting end of said barrel for displaying said indicator in the field of view of said sighting element, and first and second optically polarized elements carried by said periscope at locations on the optical axis thereof forward and to the rear of the location at which said indicator display is obliquely introduced into the field seen through said eyepiece.

6. A pyrometer according to claim 5, in which one of said polarized elements is angularly adjustably mounted whereby the relative intensity of the indicator display and of the visually sighted field of view may be selectively controlled.

7. A pyrometer according to claim 6, in which the angularly adjustable polarized element is at said eyepiece.

8. A pyrometer according to claim 4, in which said periscope includes first and second optically polarized elements carried at locations on the optical axis thereof forward and to the rear of the location at which said indicator display is introduced into the field seen through said visual sighting means.

References Cited in the file of this patent
UNITED STATES PATENTS
2,761,072    Wormser _____ Aug. 28, 1956